Patented Oct. 30, 1951

2,573,608

UNITED STATES PATENT OFFICE 2,573,608

N-FLUORENYL N-ALKYL β-HALOALKYL AMINES

George Rieveschl, Jr., Grosse Pointe Woods, Mich., assignor to Parke, Davis & Company, Detroit, Mich., a corporation of Michigan No Drawing. Application April 11, 1949, Serial No. 86,870

11 Claims. (Cl. 260—576)

This invention relates to a new class of tertiary amines and to methods for obtaining the same. More specifically, the invention relates to substituted 9-fluorenyl β-haloalkyl amines and their acid addition salts. The free bases of the compounds of the present invention have the formula,

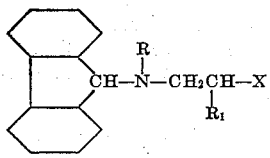

where R is a lower alkyl or lower alkenyl radical, $R_1$ is hydrogen or methyl and X is a chlorine or bromine atom.

It has been discovered that the compounds of the invention may be obtained by the action of a halogenating agent on a compound of the formula,

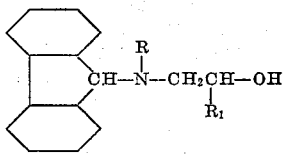

where R and $R_1$ have the same significance as given above. Some of the halogenating agents which may be used to effect this transformation are thionyl chloride, thionyl bromide, constant boiling hydrobromic acid, phosphorus oxychloride, phosphorus oxybromide, phosphorus trichloride, phosphorus tribromide, phosphorus pentachloride and the like. The reaction may be carried out by heating the two reactants for a short time in the presence or absence of a solvent. In some cases, such as when phosphorus oxychloride or constant boiling hydrobromic acid is used as the halogenating agent, an excess of the reagent serves both as a solvent and as a reactant. When halogenating agents such as thionyl chloride and thionyl bromide are used, it is preferable to carry out the reaction in an inert organic solvent such as benzene, toluene or xylene.

The compounds of the present invention are powerful sympatholytic agents and because of this ability to block the pressor effect of epinephrine they are especially useful in peripheral vascular diseases and neurogenic hypertension. They may be administered preferably as the salts of the free bases either orally or intravenously. The usual intravenous dosage is about 100–200 mg. while the oral dosage is about 150–300 mg.

The invention is illustrated by the following examples.

*Example 1.*—9-fluorenyl methyl β-chloroethyl amine

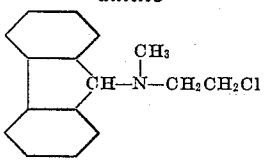

35 g. of 9-fluorenyl methyl β-hydroxyethyl amine dissolved in dry ether is added slowly to 25 cc. of thionyl chloride. After the addition has been completed, the reaction mixture is heated on the steam bath for ten minutes and the resulting mixture evaporated to dryness in vacuo. The residue which is an oil is washed in anhydrous ether and then taken up in boiling isopropanol. On cooling the crystalline hydrochloride of 9-fluorenyl methyl β-chloroethyl amine separates. Recrystallization from isopropanol yields the pure products; M. P. 183° C. with decomposition.

*Example 2.*—9-fluorenyl ethyl β-chloroethyl amine

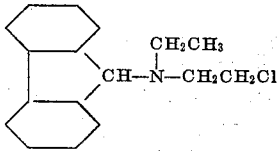

About 35 g. of o-fluorenyl ethyl β-hydroxyethyl amine dissolved in ether is added with cooling to 50 cc. of thionyl chloride. The excess thionyl chloride and ether are evaporated on a steam bath and the reaction mixture diluted with anhydrous ether. The crystalline hydrochloride salt of 9-fluorenyl ethyl β-chloroethyl amine is collected and purified by recrystallization from isopropanol; M. P. 198° C. with decomposition.

*Example 3.*—9-fluorenyl ethyl β-bromoethyl amine

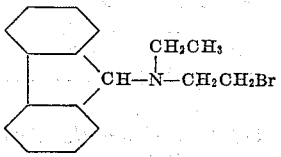

A mixture consisting of 26 g. of 9-fluorenyl ethyl β-hydroxyethyl amine and 300 g. of constant boiling hydrobromic acid is refluxed for an hour. Most of the hydrobromic acid is removed by distillation and the residue cooled. Acetone is added to the residue and the crystalline hydrobromide salt of 9-fluorenyl ethyl β-bromoethyl amine which separates collected and purified by recrystallization from isopropanol.

Example 4.—9-fluorenyl n-propyl β-chloroethyl amine

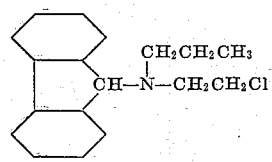

25 g. of 9-fluorenyl n-propyl β-hydroxyethyl amine dissolved in 50 cc. of toluene is added slowly to a refluxing solution of 12 cc. of thionyl chloride in 50 cc. of toluene. After the addition is complete the mixture is refluxed for one hour and then approximately one-half of the toluene distilled off in vacuo. The distillation residue is treated with ether and the crystalline hydrochloride salt of 9-fluorenyl n-propyl β-chloroethyl amine removed by filtration. The crude product can be purified, if desired, by recrystallization from acetone-ethyl acetate mixture or from isopropanol.

Example 5.—9-fluorenyl isopropyl β-chloroethyl amine

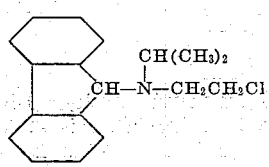

An ether solution containing about 15 g. of 9-fluorenyl isopropyl β-hydroxyethyl amine is added slowly to 25 cc. of thionyl chloride with cooling. The resulting mixture is heated on a steam bath for fifteen minutes and the reaction mixture treated with 10 cc. of methanol to remove the excess thionyl chloride. The reaction mixture is evaporated almost to dryness, the residue treated with anhydrous ether and the crystalline hydrochloride salt of 9-fluorenyl isopropyl β-chloroethyl amine collected. Recrystallization from absolute ethanol yields the pure compound in the form of colorless crystals melting at 217° C. with decomposition.

Example 6.—9-fluorenyl allyl β-chloroethyl amine

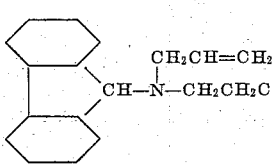

26 g. of 9-fluorenyl allyl β-hydroxyethyl amine dissolved in 50 cc. of benzene is added dropwise to 12 cc. of thionyl chloride dissolved in 50 cc. of benzene. After the addition is complete the mixture is refluxed for about one hour and then the benzene distilled off in vacuo. The residue is stirred with ether and the crystalline hydrochloride salt of 9-fluorenyl allyl β-chloroethyl amine collected and purified by recrystallization from isopropanol or isopropanol-acetone mixture.

Example 7.—9-fluorenyl n-butyl β-chloroethyl amine

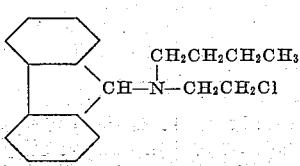

10 g. of 9-fluorenyl n-butyl β-hydroxyethyl amine dissolved in ether is added to 25 cc. of thionyl chloride. The resulting reaction mixture is heated on a steam bath for about fifteen minutes whereupon an oil which has previously separated crystallizes. The crystals are collected, washed with a small amount of ether and purified by recrystallization from isopropanol. The product thus obtained is the hydrochloride salt of 9-fluorenyl n-butyl β-chloroethyl amine.

Example 8.—9-fluorenyl n-hexyl β-chloroethyl amine

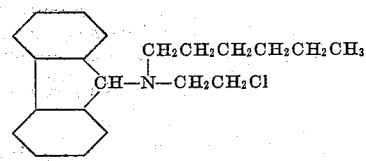

30 g. of 9-fluorenyl n-hexyl β-hydroxyethyl amine is dissolved in 50 cc. of benzene and the resulting solution added dropwise to 13 cc. of thionyl chloride in 50 cc. of benzene. After the addition has been completed the reaction mixture is refluxed for one hour and then the benzene distilled off in vacuo. The residue is stirred with ether until it crystallizes and the crystalline hydrochloride salt of 9-fluorenyl n-hexyl β-chloroethyl amine collected and purified by recrystallization from isopropanol or isopropanol-ether mixture.

Example 9.—9-fluorenyl methyl β-bromopropyl amine

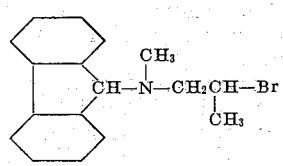

A solution consisting of 25 g. of 9-fluorenyl methyl β-hydroxypropyl amine and 600 g. of constant boiling hydrobromic acid is heated for one hour under reflux. The condenser is set for distillation and the hydrobromic acid slowly distilled off until the residue has a volume of about 100 cc. The residue is cooled, diluted with acetone and the crystalline hydrobromide salt of 9-fluorenyl methyl β-bromopropyl amine removed by filtration. The crude product can, if desired, be purified by recrystallization from isopropanol.

Example 10.—9-fluorenyl allyl β-chloropropyl amine

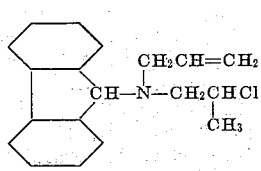

28 g. of 9-fluorenyl allyl β-hydroxypropyl amine in 50 cc. of benzene is added slowly to a solution of 13 cc. of thionyl chloride in 50 cc. of xylene. The resulting mixture is refluxed for one hour, the xylene distilled off in vacuo and the residue stirred with 500 cc. of dry ether. The crystalline hydrochloride salt of 9-fluorenyl allyl β-chloropropyl amine is collected and purified by recrystallization from isopropanol.

While the above examples deal primarily with the production of the hydrohalide salts of the new 9-fluorenyl β-haloalkyl amines, it should be understood that the invention also includes other acid addition salts of inorganic and organic acids. Some of these other salts are the citrate, benzoate, acetate, oxalate, tartrate, sulfate, phosphate and the like. These salts may be prepared from the free base of the new tertiary amines. For example, the citrate salt of 9-fluorenyl methyl β-chloroethyl amine, the compound of Example 1, may be prepared as follows: 25 g. of 9-fluorenyl methyl β-chloroethyl amine hydrochloride is dissolved in 150 cc. of water and the resulting solution made alkaline in the cold by the addition of 10% sodium hydroxide solution. The free base is extracted from the alkaline solution with ether, the combined ether extracts dried for a few minutes over anhydrous potassium carbonate and the drying agent removed by filtration. The ether solution of the free base is added to a solution of 17 g. of citric acid in 500 cc. of ether (plus a small amount of absolute ethanol to increase the solubility of the citric acid). The citrate salt which separates from the solution as a fine white powder is collected and purified by repeated washing with ether.

Other salts such as the oxalate of 9-fluorenyl methyl β-chloroethyl amine may be prepared by evaporation of the ether from a solution of the free base and adding the base to a warm solution of isopropanol containing at least one equivalent of oxalic acid. Ethyl acetate is added and on cooling the acid oxalate of 9-fluoroenyl methyl β-chloroethyl amine crystallizes out.

In its broader aspects the invention also includes the quaternary ammonium compounds derived from the 9-fluorenyl β-haloalkyl amines. The quaternary ammonium halides can be prepared by treating the free base of a 9-fluorenyl β-haloalkyl amine with an alkyl or aralkyl halide such as methyl iodide, ethyl bromide, benzochloride and the like in an inert organic solvent. The quaternary ammonium sulfonates and sulfates can be prepared in an analogous manner by using reagents such as dimethyl sulfate, methyl benzene sulfonate and methyl p-toluene sulfonate instead of the alkyl or aralkyl halides. Some examples of the compounds which can be prepared by these methods are 9-fluorenyl dimethyl β-chloroethyl ammonium iodide, 9-fluorenyl ethyl β-chloropropylmethyl ammonium benzene sulfonate, 9-fluorenyl diethyl β-chloroethyl ammonium p-toluene sulfonate, 9-fluorenyl dimethyl β-chloroethyl ammonium methyl sulfate and 9-fluorenyl ethyl β-chloroethyl benzyl ammonium chloride.

The substituted 9-fluorenyl β-hydroxyalkyl amines used as starting materials for the preparation of the new halo amines of the present invention may be prepared as described in my co-pending application, Serial Number 86,869, filed on even date herewith.

What I claim as my invention is:

1. A compound of the class consisting of a free base and its acid addition salts, said free base having the formula,

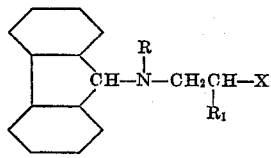

where R is a member of the class consisting of lower alkyl and allyl radicals, $R_1$ is a member of the class consisting of hydrogen and methyl and X is a member of the class consisting of chlorine and bromine.

2. A compound of the class consisting of a free base and its acid addition salts, said free base having the formula,

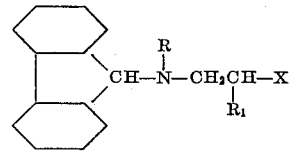

where R is lower alkyl, $R_1$ is a member of the class consisting of hydrogen and methyl and X is a member of the class consisting of chlorine and bromine.

3. An acid addition salt of a compound of formula,

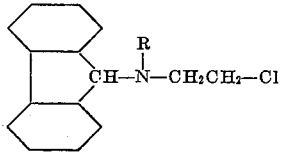

where R is a lower alkyl radical.

4. An acid addition salt of a compound of formula,

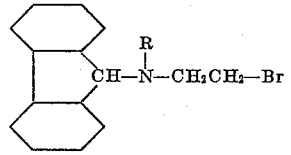

where R is a lower alkyl radical.

5. A hydrochloride salt of a compound of formula,

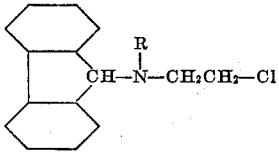

where R is a lower alkyl radical.

6. A hydrobromide salt of a compound of formula,

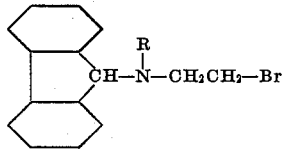

where R is a lower alkyl radical.

7. The hydrochloride salt of 9-fluorenyl ethyl β-chloroethyl amine.

8. The hydrochloride salt of 9-fluorenyl isopropyl β-chloroethyl amine.

9. The hydrobromide salt of 9-fluorenyl ethyl β-bromoethyl amine.

10. 9-fluorenyl methyl β-chloroethyl amine hydrochloride.

11. 9-fluorenyl n-propyl β-chloroethyl amine hydrochloride.

GEORGE RIEVESCHL, Jr.

No references cited.